July 25, 1939. H. J. GRAHAM ET AL 2,167,239
VEHICLE SIGNAL ARM
Filed Sept. 24, 1934   2 Sheets-Sheet 1
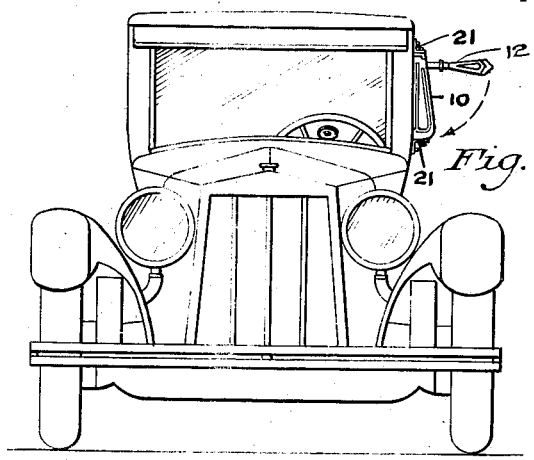
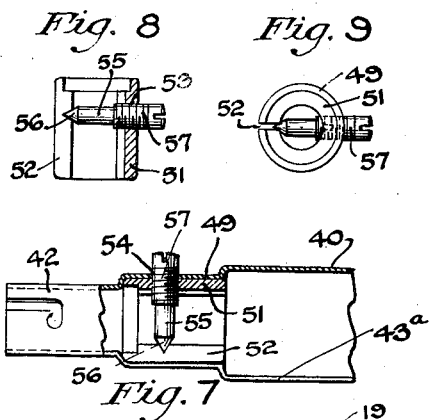
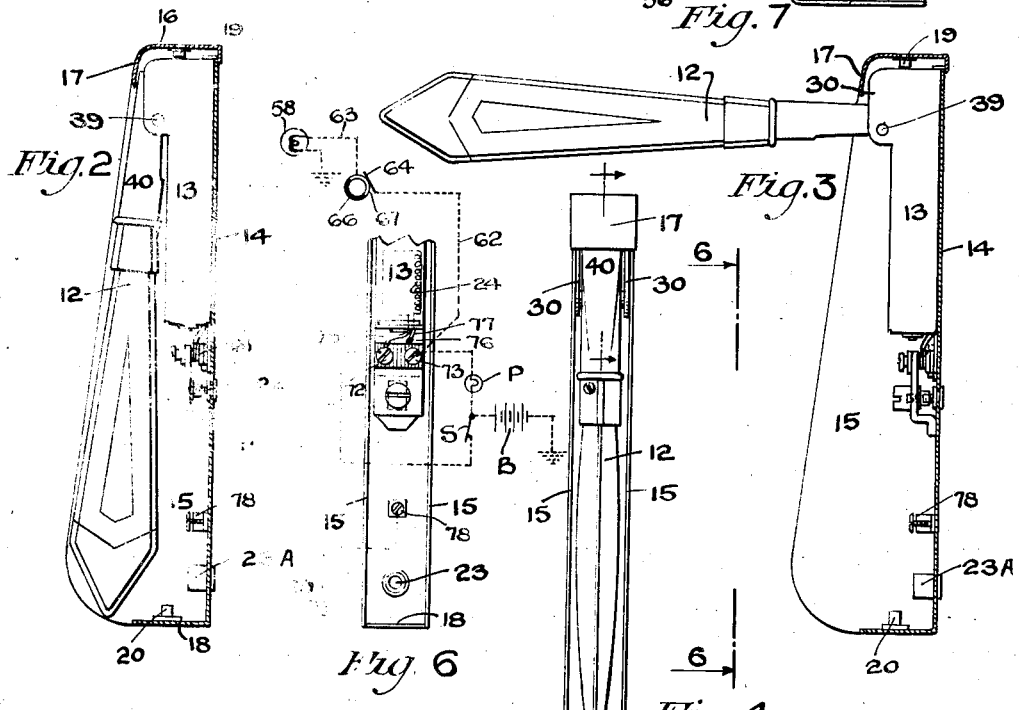
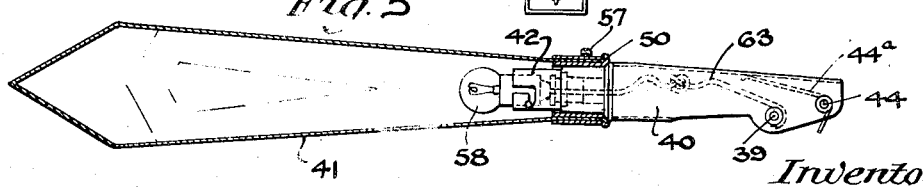
Inventor
HERBERT J. GRAHAM
HARRY YALE MAGEOCH
By Lew Edelson
Attorney

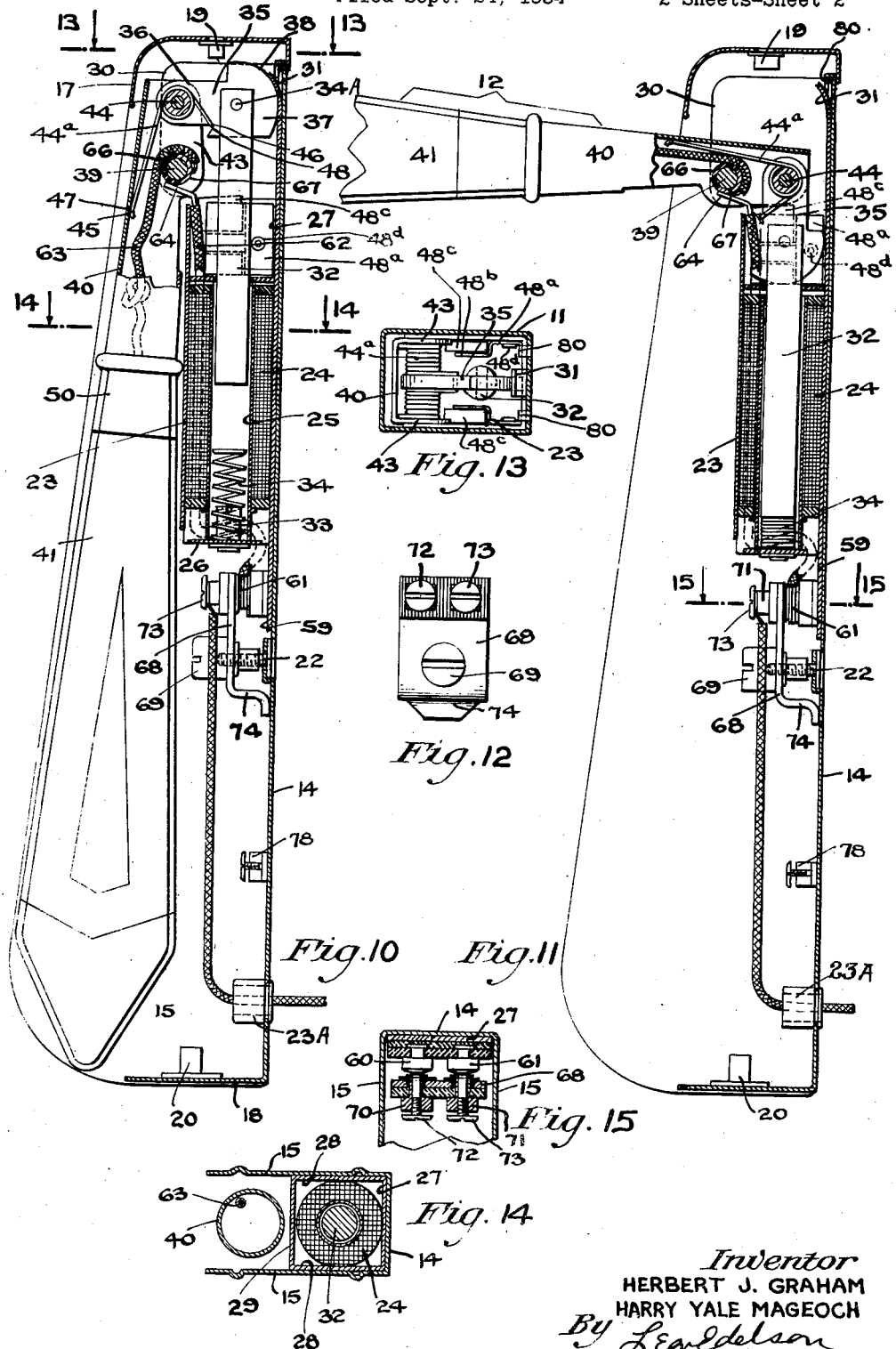

Patented July 25, 1939

2,167,239

UNITED STATES PATENT OFFICE 2,167,239

VEHICLE SIGNAL ARM

Herbert J. Graham and Harry Yale Mageoch, Philadelphia, Pa., assignors to Electric Service Supplies Company, Philadelphia, Pa., a corporation of Pennsylvania Application September 24, 1934, Serial No. 745,229

4 Claims. (Cl. 177—329)

This invention relates to signal devices and more particularly to improvements in directional signals for use in connection with motor vehicles and the like.

It is among the objects of the present invention to provide a vehicular directional signal of such design and operating characteristics that it definitely attracts the attention of the drivers of following or approaching vehicles, the signal being clearly visible during the day as well as at night to indicate the direction in which the vehicle equipped therewith is about to turn.

Another object of the invention is the provision of a directional signal having an electrically operated semaphore arm which is adapted, when not in signalling position, to be enclosed within a casing mounted upon the side of the vehicle, the casing or enclosure for the semaphore arm being of such shape and design as to avoid obstruction of the operator's view when the signals are mounted upon the front corner posts of the vehicle.

Still another object is to provide a casing for the semaphore arm of such design and construction as to compactly house not only the semaphore arm but also its operating mechanisms, as well as to protect the said mechanism from dust and moisture usually encountered under normal operating conditions.

A further object is to provide a directional signal unit of such construction that servicing thereof when required is greatly facilitated, as when it is necessary to clean or lubricate the unit, to install it upon and remove it from the vehicle and to replace the lamp contained in the semaphore arm.

A still further object of the invention is to provide an electrically illuminated semaphore type of directional signal which is adapted to be illuminated automatically as the semaphore is moved into signalling position, the lamp circuit being automatically interrupted as the arm returns to its inoperative or non-signalling position.

In the construction of vehicular directional signals of the type to which this invention relates it is of extreme importance that the signal is capable of constant operation even under unfavorable operating conditions, such as accumulated road dust and dirt, high wind pressure, lack of lubrication, low voltage supply and the like. Also, the power necessary to operate the signal should be as low as possible in order to avoid unnecessary load on the battery. To insure such operation with a minimum expenditure of power is among the aims of the present invention.

A further important object of the invention relates to the provision of means for effectively securing in position, upon an electro-magnetically operated oscillatable arm, a signal arm formed of Celluloid or other such translucent material, the securing means being so operative that while it serves to clamp the Celluloid signal arm firmly in position against accidental displacement, the possibility of injury to such arm during its removal or replacement is substantially, if not entirely, eliminated.

In addition to the foregoing, it is an object of this invention to provide an arrangement for permitting the removal of the operating mechanism for the signal arm from within its casing or enclosure without affecting or otherwise necessitating the removal of the electrical wiring, the wiring circuit for the signal being completed by the mere expedient of securing the operating mechanism in position within its casing or enclosure.

Other objects and advantages of the present invention will appear more fully hereinafter, it being understood that the invention consists generally in the combination, construction, location and relative arrangement of parts, all as will be described in the annexed specification, as shown in the accompanying drawings, and as finally pointed out in the appended claims.

In the said accompanying drawings:—

Figure 1 is a front elevational view of a motor vehicle showing mounted upon the left hand front corner post thereof the directional signal as constructed in accordance with and embodying the principles of the present invention;

Figure 2 is a side elevational view of the signal unit showing the semaphore arm in lowered, that is, inoperative position, the external casing of the unit being shown in vertical cross-section;

Figure 3 is a view similar to Figure 2 but showing the semaphore arm in raised position;

Figure 4 is an elevational view of the signal unit when viewed from the left of Figure 2;

Figure 5 is a view, partly in section, of the semaphore arm per se;

Figure 6 is an elevational view taken on the line 6—6 of Figure 3;

Figure 7 is an enlarged longitudinal sectional view of the outer end of the arm for supporting the Celluloid signal and the lamp;

Figure 8 is a view of the expander for securing the Celluloid signal arm in fixed position upon its support;

Figure 9 is an end view of the expander;

Figure 10 is an enlarged vertical sectional view of the unit as shown in Figure 2;

Figure 11 is an enlarged vertical sectional view of the unit as shown in Figure 3;

Figure 12 is a plan view of the locking clip; and

Figures 13, 14 and 15 are sectional views taken respectively along the lines 13—13 and 14—14 of Figure 10 and 15—15 of Figure 11.

Referring now more particularly to the drawings, it will be observed that in Figure 1 the directional signal unit, designated generally by the reference numeral 10, has been shown mounted upon the left-hand front corner post of the motor vehicle, the signal unit when so mounted being capable of indicating to the driver of an approaching or following vehicle that a left-hand turn is about to be made. It will be understood, of course, that a similar unit may be mounted upon the opposite or right-hand side of the vehicle for indicating when a right-hand turn is to be made and it will also be understood that the signal unit 10 is not necessarily intended for mounting upon the corner posts of the vehicle but instead may be mounted at any other desirable points on the vehicle body.

As appears quite clearly in Figures 2, 3, 4, 10 and 11, the signal unit 10 generally comprises a main casing or enclosure 11 within which is adapted to be housed the semaphore arm 12 and the operating mechanism for raising and lowering the semaphore arm into operative and inoperative positions, this operating mechanism being generally designated in Figures 2 and 3 by the reference numeral 13. The casing or enclosure 11 is of substantially channel cross-section having the back wall 14 and the opposed parallel side walls 15—15, it being observed that these side walls are of gradually increasing width from the top to the bottom extremities thereof. Extending across the upper edges of the side walls to enclose the top end of the casing is a top plate member 16, this plate member 16 being downwardly bent at its forward edge to provide a lip 17 extending between the free edges of the side walls 15—15 of the casing. The bottom end of the casing is likewise provided with a bottom closure plate 18. Respectively provided in the top and bottom plates 16 and 18 of the casing 11 are vertically aligned bushings 19 and 20 for respectively receiving the oppositely projecting pins of a pair of vertically spaced mounting brackets 21—21 (see Figure 1). Fixedly secured to the back or base wall of the casing 11 at a point intermediate the top and bottom ends thereof is an interiorly projecting threaded stud 22, the purpose of which will be apparent hereinafter. Also secured to the wall 14 of the casing 11 adjacent the bottom end thereof is a tubular bushing 23A through which the conductor wires leading from a suitable source of electrical energy, such as the storage battery of the vehicle, may be projected interiorly of the casing.

The mechanism for actuating the semaphore arm 12 whereby the same may be lifted into the signaling position shown in Figures 1, 3 and 11 is in the form of a unitary assembly adapted to be quick-detachably secured in position within the casing 11. As appears most clearly in Figures 10, 11 and 14, this operating mechanism essentially comprises a tubular casing 23 within the interior of which is non-rotatably fixed an electromagnet 24, this electromagnet being provided with an axially extending tubular shell 25, the bottom portion of this tubular shell being extended beyond the lower end of the electromagnet to the bottom plate 26 of the solenoid casing 23. The rear wall 27 of the solenoid casing 23 extends upwardly a substantial distance above the top end of the electromagnet 24, as do the opposite side walls 28—28 of said casing. Also, as appears most clearly in Figures 2, 3, 10 and 11, it will be observed that the upper portions of the opposed side walls 28—28 of the solenoid casing extend forwardly beyond the vertical plane of the front wall 29 thereof, these forwardly projecting portions being designated by the reference numeral 30. The said front wall 29 of the solenoid casing extends upwardly beyond the top end of the solenoid 24 to a point just below the forwardly projecting portions 30—30. The upper extremity of the back wall 27 of the solenoid casing 23 is curved to provide an arcuated seat 31 for a purpose which will be presently described.

Axially disposed within the tubular shell 25 of the electromagnet 24 is an armature 32, the normal arrangement of this armature within the bore of the electromagnet being such that upon energization of the latter the armature is drawn downwardly to operatively actuate the semaphore arm 12. Fixed to the bottom plate 26 of the solenoid casing and projecting upwardly into the bore 25 of the solenoid is a plug 33 for increasing the pull of the solenoid 24 upon the armature 32 as the latter reaches the limit of its downward stroke. A coiled compression spring 34 is also fixed to the bottom plate 26 of the solenoid casing in embracing relation with respect to the solenoid plug 33, this spring serving the two-fold function of absorbing the shock of impact of the semaphore arm as it assumes its raised position and of propelling the armature upwardly upon deenergization of the electromagnet, thereby assisting in the lowering of the semaphore arm 12 into its non-signalling, inoperative position.

Pivotally secured, as by the pin 34A, to the upper extremity of the armature 32, is a link 35 of the shape more particularly shown in Figures 10 and 11. This link 35 is provided with a forward projection 36 and with an enlarged rear portion 37 having an arcuately curved edge 38, the curvature of this edge 38 corresponding to that of the arcuated seat 31 in the upper extremity of the rear wall 27 of the solenoid casing.

Pivotally mounted upon a pin 39 journalled between the forwardly extending portions 30—30 of the opposed side walls of the solenoid casing is the semaphore arm designated generally by the numeral 12. This arm essentially comprises a metallic section 49 upon the outer extremity of which is mounted a translucent shell 41 formed of Celluloid or other such material. Inasmuch as the construction of this shell is fully described in a copending application, Serial No. 745,228, filed September 24, 1934, the constructional details thereof will not be described herein, it being understood that insofar as the present invention is concerned any suitable light translucent shell may be employed without affecting the operation or principles of construction of the signaling mechanism herein described. The support 40 for the shell 41 is of substantially hollow construction and is constructed in its outer extremity in the form of a lamp receiving socket 42 (see Figure 7). For a purpose which will be apparent hereinafter, the supporting arm 40 is longitudinally slitted, as at 43a, from end to end thereof. The inner or hinged extremity of this arm 40 is provided with a pair of opposed parallel ears 43—43 between which extends a pin 44, this pin being projected through the forwardly projecting end 36 of the link 35, thus affording a link connection between the upper end of the armature 32 and the inner end of the indicator shell supporting arm 40. A coil spring 44a embraces the pin 44, the free oppositely pressed ends 45 and 46 of this coil spring being respectively in engagement with the wall of the arm 40, as at 47, and with the bottom edge of the link 35, as at 48.

Secured upon the opposite side walls 28—28 of the solenoid casing 23 adjacent the upper ends thereof are a pair of brackets 48a—48a, each of which is characterized by the offset portion 48b to form a socket for receiving a rubber stop 48c or the like. The brackets 48a—48a are permanently secured to the opposite side walls of the solenoid casing by the rivets 48d or the like so as to position their respective stops 48c—48c for engagement by the free edges of the ears 43—43 of the metallic arm 40 when the latter is shifted into the position shown in Figure 11. The rubber stops 48c—48c thus serve as bumpers for absorbing the shock imparted to the semaphore arm when the solenoid is energized to raise the latter into signalling position. Also, these rubber bumpers function to take up any play which may develop between the arm 40, the armature 32 and their interconnecting link 35, thus eliminating vibration of the semaphore arm when in its operative position.

From the foregoing, it will be observed that upon energization of the solenoid 24, the armature 32 will be drawn downwardly toward the solenoid plug 33, at the same time effecting the compression of the spring 34. As the plunger is drawn downwardly, it, of course, pulls the link 35 downwardly and away from its curved seat 31, in consequence of which that end of the link 35 which is connected by the pin 44 to the arm 40 will draw the upper end of the arm 40 inwardly and downwardly, thereby effecting the rotation of the arm about its pivot 39 from its lowered position, as seen in Figure 10, to its raised position, as seen in Figure 11. The coil spring 44a tends constantly to maintain the link 35 angularly disposed with respect to the arm 40, as shown in Figures 10 and 11. In other words, when the semaphore arm 12 is in its lowered or inoperative position, as shown in Figure 10, the spring 44a tends to maintain the link 35 with the curved edge 38 thereof in engagement with its curved seat 31. It will thus be seen that when the electromagnet is deenergized, the weight of the semaphore arm 12 will cause it to drop toward its lower position, thus drawing the link 35 upwardly and outwardly around the pivot 39, thereby causing the armature 32 to be lifted upwardly. The compression spring 34 assists in this action in that it imparts to the armature 32 an upward thrust, in consequence of which the curved edge 38 of the link 35 is brought into engagement with its seat 31, the link being held in this position by means of the coil spring 44a. In this latter position, the link 35 serves effectually to lock the semaphore arm in its inoperative position, this being due to the fact that any force exerted on the semaphore arm to rotate the same about its pivot 39 is transmitted against the back wall 27 of the solenoid casing 23 along a line passing commonly through the pivot pins 44 and 34. It will thus be appreciated that the semaphore arm 12 can only be released from its locked position upon the application of a force applied axially of the armature 32 so as to draw the curved edge 38 of the link 35 downwardly and away from its seat 31. This actuating force upon the armature 32 is that which is normally obtained by the electrically energized solenoid 24 acting upon the armature 32.

As appears most clearly in Figures 5 and 7 to 9, the support 40 for the signal arm 41 is not only provided with the lamp socket construction 42 hereinbefore referred to, but is also provided with a section 49 of reduced diameter upon which is adapted to be frictionally engaged the metal collar 50 (see Figure 5) which is fixedly secured to the inner end of the Celluloid signal arm 41. Disposed within the reduced portion 49 of the supporting arm 40 is an expansible bushing or collar 51 which is longitudinally slitted, as at 52, this collar being provided at a point in the wall thereof diametrically opposite to the slit 52 with a threaded aperture 53 which is in registry with a somewhat larger aperture 54 in the portion 49 of the arm 40. The collar 50 of the shell 41 is similarly provided with an aperture for registry with the apertures 53 and 54 aforesaid. An expanding pin 55 having a tapered extremity 56 is adapted to be projected radially through the aligned apertures in the parts 50, 49 and 51, this pin being provided with an enlarged threaded portion 57 adapted for threaded engagement within the aperture 53, it being apparent that as the pin is moved radially inwardly of the concentrically arranged members 50, 49 and 51, its tapered extremity will engage between the split extremities of the expansible member 51 whereby to cause the latter to expand and so expand the longitudinally slitted portion 49 into tight engagement with the internal surface of the collar 50, thus securing the latter firmly in position upon its support 40. The kerfed end of the pin 55, extending as it does through the aperture in the collar 50, serves to locate the collar angularly with respect to its support 40, thus insuring the proper relation of the signal shell 41 with respect to its support.

An important feature of the herein described directional signal unit is the arrangement for facilitating the bodily removal and replacement of the semaphore arm 12 and its associated operating mechanism 13 with respect to the outer protective enclosure or casing 11. The signalling mechanism is secured within its protective casing through the medium of a single, readily removed securing element, the latter serving also to complete the electrical circuit leading from the source of supply to the electro-magnet 24 and the lamp 58 (see Figure 5). The arrangement is such that upon the removal of the single fastening element, the semaphore arm 12 and its associated operating mechanism 13 may be readily removed from the casing 11 without disrupting the electrical wiring in and between these parts. The arrangement for effecting this desirable result is described as follows:

Mounted upon the downward projection 59 of the rear wall 27 of the solenoid casing are a pair of laterally spaced contact buttons 60 and 61, these latter being supported upon the projection 59 in insulating relation with respect thereto. Permanently connected, as by soldering, to the contact 60 is the lead 75 from the electromagnet 24, while similarly connected directly to the solenoid casing, as at 76, is the solenoid lead 77 (see Figure 6).

Connected to the insulated contact button 61 is a conductor 62—63 leading to the center contact of the lamp socket (not shown). The section 62 of the lamp conductor is preferably of stiff wire, the free upper end 64 thereof being arranged to frictionally bear against a circuit making-and-breaking ring fixed to the support 40 for rotation therewith about the semaphore arm pivot 39, this conductor ring comprising a non-conductive segment 66 and a conducting segment 67, the ring being so arranged that when the semaphore arm is in its lowered position, the extremity 64 of the conductor section 62 is in contact with the non-conductive segment 66, thus interrupting the circuit of the lamp. Interconnecting the center contact of the lamp socket and the electrically conductive segment 67 of the conductor ring is the flexible section 63 of the lamp conductor, the circuit to the lamp being completed only when the semaphore arm is raised sufficiently to rotate the conducting segment 67 into engagement with the extremity 64 of the conductor section 62.

Adapted to be secured to the threaded stud 22 projecting interiorly of the rear wall 14 of the outer casing is a securing bracket 68 of substantially L shape in longitudinal cross-section. Mounted upon the main body of this bracket 68 for threaded engagement with the stud 22 is an axially immovable but freely rotatable nut 69. Also mounted upon the main body of the bracket 68 adjacent the free edge thereof are a pair of laterally spaced, interiorly threaded bushings 70 and 71, suitably insulated from the bracket 68. Screws 72 and 73 are provided for respectively securing conductor leads to the bushings 70 and 71, the lead to the bushing screw 72 being connected to the battery B, preferably through a suitable switch S, the lead to the bushing screw 73 being also connected to the battery through a pilot device P, as for example, a pilot lamp or a relay for operating a pilot lamp. As appears most clearly in Figures 6, 10 and 11, the enclosure 11 is provided in the base wall 14 thereof with a screw terminal 78 to which is adapted to be connected a conductor 79 leading to ground (see Figure 6), it being understood that this ground conductor 79 as well as the conductors respectively leading to the terminals 72 and 73 are projected interiorly of the casing 11 through the bushing 23A.

The bracket 68, when properly secured in position as shown in Figures 10 and 11, is so arranged that when the nut 69 is threaded upon the stud 22, the leg 74 of the bracket engages the wall 14 of the casing and thus serves as a fulcrum about which the main body of the bracket 68 rotates not only to insure proper electrical contact between the bushings 70 and 71 and the contact buttons 60 and 61, respectively, but also to effectually secure the semaphore operating mechanism as a unit within its protective casing 11, it being observed in respect to this latter function of the bracket 68 that the upper end of the operating mechanism is retained in position within the casing 11 by the downwardly depending struck-out lugs 80—80 provided adjacent the top of the casing, these lugs being engaged over the upper edge of the rear wall 27 of the solenoid casing, as appears most clearly in Figures 10, 11 and 13.

Whenever it is desired to remove the semaphore arm and its associated operating mechanism from within the outer casing 11, as for purposes of inspection, maintenance, replacement of parts or other servicing, it is merely necessary to disengage the nut 69 from the stud 22, thus permitting the bracket 68 to be removed from its position shown in Figures 10 and 11 whereupon, by swinging the semaphore arm outwardly of its casing, it and its associated operating mechanism may be readily removed for the purposes aforesaid. In the operation of removing or replacing the interior unit the wiring thereof is in no wise disturbed.

Should it ever be necessary to manually release the signal arm 12 from its locked position, as when the unit is removed from its supporting brackets 21 and the electrical circuit to the electromagnet is interrupted, this can be effected by simply inserting a pin through the upper supporting bushing 19 to depress the link 35 against the action of the spring 44a sufficiently to disengage the link from its seat 31, whereupon the arm 12 may be freely rotated about its pivot 39 into the raised position shown in Figures 3 and 11.

The wiring to the lamp 58 may be traced as follows:—from the non-grounded terminal of the battery B through the pilot device P to the binding screw 73, the bushing 71, the contact button 61, the conductor 62—63, the center contact of the lamp socket, through the lamp 58 and thence to ground by way of the metallic arm 40, the solenoid casing 23, the rear wall of the outer casing 14, and the grounded lead 79 connected to the terminal 78, the opposite terminal of the battery being, of course, also grounded.

The wiring to the solenoid 24 may be traced as follows:—from the non-grounded terminal of the battery through the switch S to the bushing 70, thence to the contact button 60, through the solenoid coil, and finally to the grounded conductor 79, as in the case of the lamp circuit.

As was mentioned above, two signal units are preferably employed upon each vehicle, the units being mounted upon opposite sides thereto to indicate contemplated right and left-hand turns.

A double throw switch (not shown) for controlling the signals is preferably mounted at any convenient point in the driver's compartment, as on the dash or steering column of the vehicle, this switch being so connected in circuit with the signal units that when its lever is thrown to the right the right-hand signal will be operated whereas when it is thrown to the left, the other signal will be operated.

The wiring arrangement is such that the pilot device P affords a positive indication that the semaphore is functioning properly, it being apparent that if the pilot lamp, which is preferably so located as to be readily observable by the vehicle operator, fails to light up, the operator will at once known that the lamp 58 in the semaphore arm has burned out or is otherwise not functioning, or that the semaphore arm has failed to rise into signalling position, because unless the arm is raised to a height sufficient to rotate the conductor segment 67 into contact with the spring finger 64, the lamp circuit will not be closed. This wiring arrangement is an important feature of the invention.

From the foregoing, it will be apparent that a directional signal unit has been devised which is extremely compact and simple in design and construction, thus occupying a minimum of space when not in action, at the same time that it is adapted for easy installation upon any type of vehicle. Moreover, by the present invention the semaphore arm is held securely in place when inactive so that sway or vibration of the vehicle makes impossible any tendency for the semaphore arm to accidently emerge from its casing. The casing is of such design as to render the unit practically dust and water proof throughout. In addition to the foregoing features, the entire operating mechanism of the signal unit is removably intact from its outer casing or enclosure by the simple expedient of removing a single nut, the retaining bracket serving not only to hold the operating mechanism rigidly in place but also to complete the electrical connections to the electromagnet and to the lamp, the necessity for removable wires being entirely obviated. Also, the expanding means for positively securing the Celluloid illumined signal arm upon the lamp-supporting arm is an important feature of the invention in that it provides for the ready replacement of burned out lamps at the same time that it insures the proper relative position of the illumined signal arm with respect to the lamp and other parts of the signal unit.

It will be understood, of course, that the constructional details as hereinbefore described, are capable of various changes and modifications from time to time, all without departing from the general principles or real spirit of the invention or inventions, and it is intended therefore to claim the same broadly, as well as specifically, as indicated by the appended claims.

What is claimed as new and useful is:

1. In a vehicular signal, in combination, a main casing for a signaling unit, a signaling unit disposed within said casing and comprising a solenoid casing upon which is pivoted a semaphore arm, said main casing being provided adjacent one end thereof with lugs under which the upper edge of said solenoid casing is adapted to be accommodated, said solenoid casing being provided at the lower extremity thereof with an extension which is in electrical contact with the main casing and which is provided with a pair of insulated electrical contact members, one terminal of the solenoid being directly connected to one of said contact members and the other solenoid terminal being connected to said extension of the solenoid casing, the other of said contact members being connected to the ungrounded terminal of a source of electrical supply, a bracket securable to the main casing and adapted to overlie said contact members for clamping said extension of the solenoid casing in position against said main casing, said bracket being provided with a pair of terminal members for completing the circuit from said source of electrical supply to said solenoid, said terminal members being respectively adapted for electrical contact with said contact members, and means for securing said bracket to said casing.

2. In a vehicular signal, in combination, a main casing for a signaling unit, a signaling unit disposed within said casing comprising a semaphore arm and a solenoid assembly having an armature adapted to actuate said arm, means for pivotally securing said arm to said casing in operative relation to said armature, means for positionally securing the upper end of said unit within said main casing, a bracket member secured to the main casing for detachably clamping the lower end of said signaling unit immovably against said main casing, coacting means in said bracket member and said main casing for securing the former to the latter, and means provided in said bracket for completing the electrical circuit leading to said solenoid assembly automatically as said bracket is secured in clamping position.

3. In a vehicular signal, in combination, a main casing for a signaling unit, a signaling unit disposed within said casing comprising a semaphore arm and a solenoid assembly having an armature adapted to actuate said arm, means for pivotally securing said arm to said casing in operative relation to said armature, means for positionally securing the upper end of said unit within said main casing, a bracket member secured to the main casing for detachably clamping the lower end of said signaling unit immovably against said main casing, said bracket member having terminals for connection to electrical conductors leading to a source of electric supply, coacting means in said bracket member and said main casing for securing the former to the latter, and means provided in said bracket for completing the electrical circuit leading to said solenoid assembly automatically as said bracket is secured in clamping position, said bracket being removable from its said clamping position whereby to permit the signaling unit to be bodily withdrawn from said main casing without disrupting the electrical circuit in said unit or necessitating the disconnecting of the electrical conductors leading from the source of supply to the bracket.

4. In a vehicular signal, in combination, a main casing, a signaling unit adapted to be housed within said casing and comprising a semaphore arm and an electromagnetic assembly having an armature for actuating said arm, means for pivotally securing said arm to said casing in operative relation to said armature, a bracket securable to the main casing and adapted to coact with means provided in said electromagnetic assembly for detachably securing said signal unit immovably within said main casing, and coacting means in said bracket member and said main casing for securing the former to the latter, said signaling unit being permanently and completely wired electrically independently of said bracket, which latter is electrically connected through suitable conductors to a source of electrical supply, said bracket being provided with means to complete the circuit from said source of supply to and through said signaling unit automatically as said bracket is secured in clamping position.

HERBERT J. GRAHAM.
HARRY YALE MAGEOCH.